United States Patent
Golan et al.

(10) Patent No.: US 8,824,823 B1
(45) Date of Patent: Sep. 2, 2014

(54) INCREASED QUALITY OF IMAGE OBJECTS BASED ON DEPTH IN SCENE

(75) Inventors: Oren Golan, Or-Yehuda (IL); Itshak Horovitz, Holon (IL)

(73) Assignee: Verint Americas Inc., Melville, NY (US)

( * ) Notice: Subject to any disclaimer, the term of this patent is extended or adjusted under 35 U.S.C. 154(b) by 301 days.

(21) Appl. No.: 13/354,919

(22) Filed: Jan. 20, 2012

Related U.S. Application Data

(60) Provisional application No. 61/434,715, filed on Jan. 20, 2011.

(51) Int. Cl.
*G06K 9/42* (2006.01)
*G06K 9/40* (2006.01)

(52) U.S. Cl.
USPC .......................................... 382/257; 382/261

(58) Field of Classification Search
None
See application file for complete search history.

(56) References Cited

U.S. PATENT DOCUMENTS

| | | | | |
|---|---|---|---|---|
| 6,658,136 B1* | 12/2003 | Brumitt | | 382/103 |
| 7,003,136 B1* | 2/2006 | Harville | | 382/103 |
| 7,412,110 B1* | 8/2008 | Worthington | | 382/279 |
| 8,116,522 B1* | 2/2012 | Buck et al. | | 382/103 |
| 2007/0122058 A1* | 5/2007 | Kitaura et al. | | 382/284 |
| 2012/0328156 A1* | 12/2012 | Nakano et al. | | 382/103 |
| 2013/0022261 A1* | 1/2013 | Imai et al. | | 382/154 |

OTHER PUBLICATIONS

Strauss et al., "Variable structuring element based fuzzy morphological operations for single viewpoint omnidirectional image", LIRMM, 2007.*

* cited by examiner

*Primary Examiner* — Randolph I Chu
(74) *Attorney, Agent, or Firm* — Andrus Intellectual Property Law, LLP

(57) ABSTRACT

Systems, methods, and software for operating an image processing system are provided herein. In a first example, a method of operating an image processing system is provided. The method includes identifying object pixels associated with an object of interest in a scene, identifying additional pixels to associate with the object of interest, and performing an operation based on a depth of the object in the scene on target pixels comprised of the object pixels and the additional pixels to change a quality of the object of interest.

17 Claims, 2 Drawing Sheets

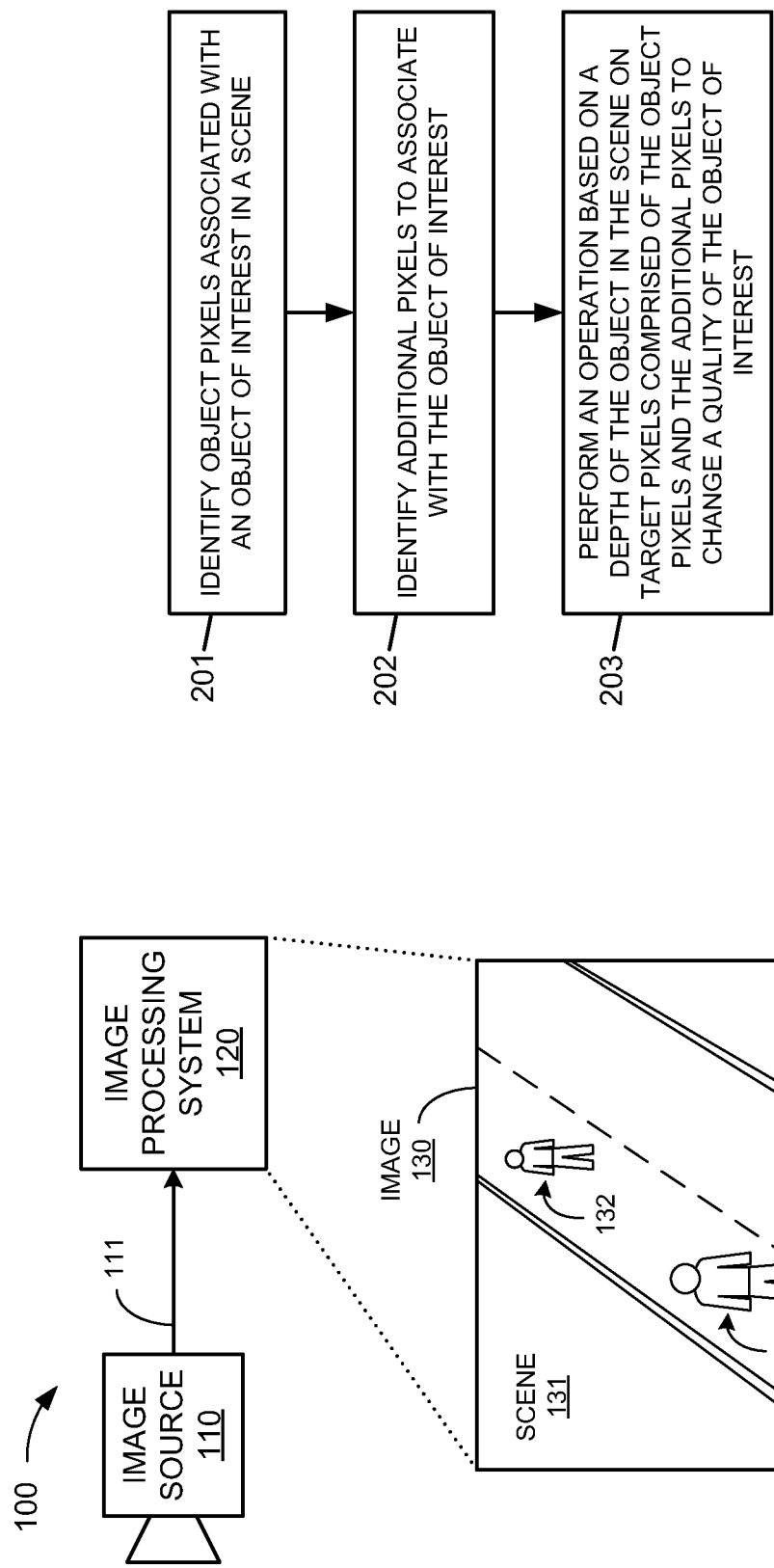

US 8,824,823 B1

INCREASED QUALITY OF IMAGE OBJECTS BASED ON DEPTH IN SCENE

RELATED APPLICATIONS

This application claims priority to and incorporates by reference U.S. Provisional Application No. 61/434,715, entitled OBJECT SEPARATION IN IMAGES, filed on Jan. 20, 2011.

TECHNICAL FIELD

Aspects of the disclosure are related to the field of image and video processing, and in particular, performing operations on objects in video frames or associated images.

TECHNICAL BACKGROUND

Imaging and video systems typically include an image source, such as a video camera, image sensor, or other equipment to capture and digitize visual scenes as video or image data. This data can be stored for later use on digital storage systems, such as servers, storage drives, buffers, or other storage systems. Video or image processing systems can retrieve the image or video data and manipulate the data by performing various operations on the data.

In video surveillance systems, image analysis can be employed to identify objects of interest in a video or frames of the video. These objects of interest can include people, geographical features, vehicles, and the like, and it may be desirable to digitally separate various objects in a video from each other as well as from features that are not of interest. These objects of interest can then be tracked across various frames of the video, and further analysis or action can be taken for the individual objects.

Example object manipulation operations include dilate and erode operations. In the dilate operation, pixels of an object are increased in quantity based on the shape of the object, while in the erode operation, pixels are typically removed from an object based on the edges of the object. A dilate operation followed by an erode operation can also be referred to as a 'close' operation. However, when these various operations are performed on image data associated with video of a scene, they can lead to undesirable merging of objects of interest with each other as well as undesirable pixel artifacts internal to the objects.

Overview

Systems, methods, and software for operating an image processing system are provided herein. In a first example, a method of operating an image processing system is provided. The method includes identifying object pixels associated with an object of interest in a scene, identifying additional pixels to associate with the object of interest, and performing an operation based on a depth of the object in the scene on target pixels comprised of the object pixels and the additional pixels to change a quality of the object of interest.

In another example, computer-readable medium having program instructions stored thereon for operating an image processing system is provided. When executed by the image processing system, the program instructions direct the image processing system to identify object pixels associated with an object of interest in a scene, identify additional pixels to associate with the object of interest, and perform an operation based on a depth of the object in the scene on target pixels comprised of the object pixels and the additional pixels to change a quality of the object of interest.

In another example, a method of operating an image processing system is provided. The method includes identifying an object of interest in a scene comprising object pixels, and performing a close operation on the object pixels using a variable sized kernel to improve a quality of the object of interest.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 is a system diagram illustrating an imaging system;

FIG. 2 is a flow diagram illustrating a method of operation of a image processing system.

DETAILED DESCRIPTION

Figure 3:
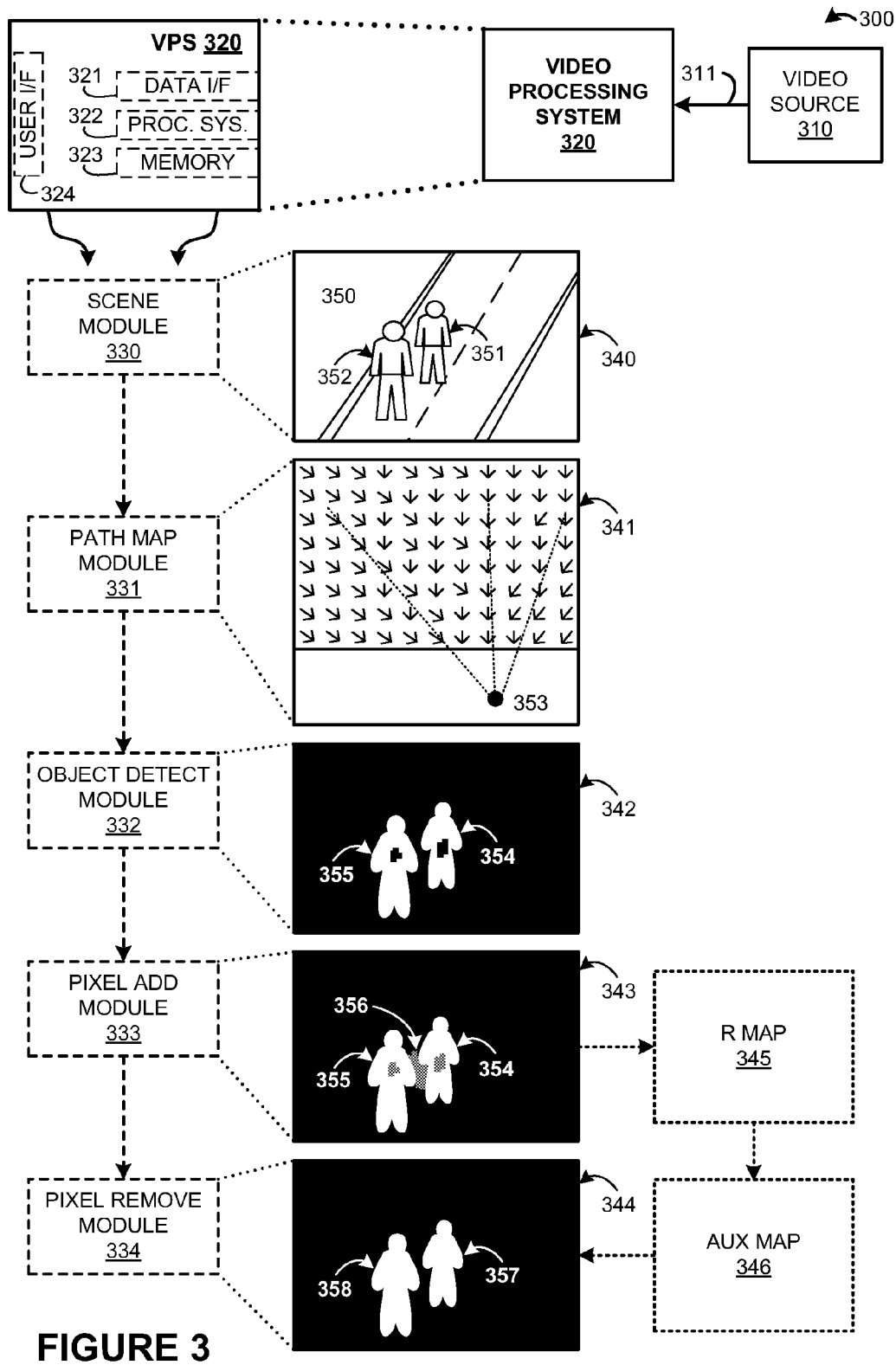
FIG. 3 is a system diagram illustrating a video system.

FIG. 1 is a system diagram illustrating imaging system 100. Imaging system 100 includes image source 110 and image processing system 120. Image source 110 and image processing system 120 communicate over link 111. Other systems and equipment, such as networking systems, transfer systems, or storage systems, can be included between image source 110 and image processing system 120, but such systems are omitted in FIG. 1 for clarity.

FIG. 1 also includes image 130, which may be an image or video frame captured of scene 131 by image source 110 and transferred for processing to image processing system 120. Image 130 includes two objects, namely object 132 and object 133 positioned on a road in scene 131. Although objects 132-133 are shown as humans in FIG. 1, it should be understood that any object can be included, such as vehicles, animals, structural features, geographic features, or other objects. Also, image 130 can include any number of different objects or scenes.

FIG. 2 is a flow diagram illustrating a method of operation of image processing system 120. The operations of FIG. 2 are referenced herein parenthetically. In FIG. 2, image processing system 120 identifies (201) object pixels associated with an object of interest in scene 131. In this example, the object of interest is object 133, although object 132 can be selected as an object of interest. Object 133 is comprised of object pixels, such as pixels representing object 133 in a digital image or video frame. Object 133 can be identified through various object recognition methods.

Image processing system 120 identifies (202) additional pixels to associate with the object of interest. When an object of interest is recognized or identified in a scene, spurious pixels such as image processing artifacts may be included in the object pixels or excluded from the object pixels, providing for an identified object with a low object quality. In this example, additional pixels are identified to be included with the object pixels to form a higher quality object of interest.

Image processing system 120 performs (203) an operation based on a depth of the object in scene 131 on target pixels comprised of the object pixels and the additional pixels to change a quality of the object of interest. In images or frames of 3-dimensional scenes, the shape or size of an object can depend on the location of the object in the image or frame due to perspective effects of the 3-dimensional scene. Thus, a depth of an object in image 130 can relate to its perceived shape or size. For example, object 133 is a first size and is located at a first position in image 130, while object 132 is a second size and is located at a second position image 130. Thus, both object 132 and 133 may be a similarly sized human, but are shown as different sizes in image 130 due to the depth and perspective nature of scene 131. The operation can be performed on the object of interest based on its size and position in image 130. A first operation granularity or kernel size can be employed for object 133, while a second operation granularity or kernel size can be employed for object 132. The operation can include an image processing operation such as dilate, erode, or a close operation, among other operations. In some examples, a line-by-line operation is performed on image 130 to identify pixels to include or exclude from the object of interest to improve the quality of the object of interest.

Advantageously, the operations described herein enact a variable-kernel perspective-based 'close' operation exceeding the performance of a conventional fixed-kernel morphological 'close' operation. In further examples, such as when the objects of interest are human figures, a height of an average human (in pixels) if the human was located at each pixel in the scene can be identified based on a vertical vanishing point of the scene. A variable kernel is then determined for the operation based on the height and the depth of the object in the scene, and the operation is performed on the scene using the variable kernel.

Referring back to FIG. 1, image source 110 may include any device having the capability to capture video or images. Image source 110 comprises circuitry and an interface for transmitting video or images. Image source 110 may be a device which performs the initial optical capture of video, may be an intermediate video transfer device, or may be another type of video transmission device. For example, image source 110 may be a video camera, still camera, internet protocol (IP) camera, video switch, video buffer, video server, or other video transmission device, including combinations thereof.

Image processing system 120 may include any device for processing or analyzing video, video streams, or images. Image processing system 120 can include processing circuitry and an interface for receiving image or video data. Image processing system 120 is capable of performing one or more processes on the video or image data received from image source 110. The processes performed on the images or video may include viewing, storing, transforming, mathematical computations, modifications, object identification, analytical processes, conditioning, other processes, or combinations thereof. Image processing system 120 may also include additional interfaces for transmitting or receiving video streams, a user interface, memory, software, communication components, a power supply, or structural support. Image processing system 120 may be a video analytics system, server, digital signal processor, computing system, or some other type of processing device, including combinations thereof.

Link 111 can include a digital data link, video link, packet link, and may be a wireless, wired, or optical link. Link 111 may include multiple links. The links may use any of a variety of communication protocols, such as packet, telephony, optical networking, wireless communication, or any other communication protocols and formats, including combinations thereof. The link between image source 110 and image processing system 120 may be direct as illustrated or may be indirect and accomplished using other networks or intermediate communication devices.

FIG. 3 is a system diagram illustrating video system 300. System 300 includes video source 310 and video processing system 320. In this example, video source 310 provides images in the form of video frames for delivery to video processing system 320 over link 311. Link 311 is an Internet protocol (IP) packet networking link in this example, and can include further systems such as networking, transfer, or storage systems. Video processing system 320 is shown in a detailed exploded view to highlight the elements of video processing system 320 in FIG. 3. Video processing system 320 may be an example of image processing system 120 found in FIG. 1, although image processing system 120 can use other configurations.

Video processing system 320 (VPS) 320 includes data interface 321, processing system 322, memory 323, and user interface 324. In operation, processing system 322 is operatively linked to data interface 321, memory 323, and user interface 324. Processing system 322 is capable of executing software stored in memory 323. When executing the software, processing system 322 drives VPS 320 to operate as described herein.

Data interface 321 may include communication connections and equipment that allows for communication and data exchange with image capture systems, image storage systems, video capture systems, or video storage systems. Examples include network interface cards, network interfaces, storage interfaces, or other data interfaces capable of communicating over various protocols and formats, which may include TDM, IP, Ethernet, optical networking, wireless protocols, communication signaling, or some other communication format, including combinations thereof.

Processing system 322 may be implemented within a single processing device but may also be distributed across multiple processing devices or sub-systems that cooperate in executing program instructions. Examples of processing system 322 include general purpose central processing units, microprocessors, application specific processors, and logic devices, as well as any other type of processing device.

Memory 323 may comprise any storage media readable by processing system 322 and capable of storing software. Memory 323 may include volatile and nonvolatile, removable and non-removable media implemented in any method or technology for storage of information, such as computer readable instructions, data structures, program modules, or other data. Memory 323 may be implemented as a single storage device but may also be implemented across multiple storage devices or sub-systems. Memory 323 may comprise additional elements, such as a controller, capable of communicating with processing system 322. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 323 may comprise computer program instructions, firmware, or some other form of computer- or machine-readable processing instructions having processes that when executed by processing system 322 direct VPS 320 to operate as described herein. For example, software drives VPS 320 to receive image data, identify objects of interest in scenes, identify pixels for inclusion or exclusion with the objects of interest, and process the objects of interest and additional pixels to improve a quality of the objects of interests in the scene, among other operations. The software may also include user software applications. The software may be implemented as a single application or as multiple applications. In general, the software may, when loaded into processing system 322 and executed, transform processing system 322 from a general-purpose device into a special-purpose device customized as described herein.

User interface 324 may have input devices such as a keyboard, a mouse, a voice input device, or a touch input device, and comparable input devices. Output devices such as a display, speakers, printer, and other types of output devices may also be included with user interface 324. User interface 324 may also be considered to be an integration of VPS 320 with software elements, such as operating system and application software. For instance, a user may navigate an application view using a user device, such as a mouse, or initiate an image operation using a keyboard. The interface functionality provided by the integration of user interface software with user interface devices can be understood to be part of user interface 324.

Video source 310 may comprise any device having the capability to capture video or images. Video source 310 comprises circuitry and an interface for transmitting video or images. Video source 310 may be a device which performs the initial optical capture of video, may be an intermediate video transfer device, or may be another type of video transmission device. For example, video source 310 may be a video camera, still camera, internet protocol (IP) camera, video switch, video buffer, video server, or other video transmission device, including combinations thereof.

In operation, video processing system 320 operates through five exemplary modules as illustrated in FIG. 3, namely modules 330-334, although other configurations can be employed. These modules can comprise computer-readable instructions included in memory 323 and executed by processing system 322. It should be understood that the sequence or structure of modules in FIG. 3 can be altered without changing the scope of the methods, software, and systems described herein.

Scene module 330 receives image data or video data associated with a scene. In this example, scene module 330 receives video frame 340, which can be part of a video stream or video sequence received over link 311. Video frame 340 includes scene 350 depicting a 3-dimensional scene of two human FIGS. 351-352 on a road represented in a two-dimensional video frame 340. Video frame 340 includes pixels forming the scene depicted therein, and can be of any digital image format or digital video format.

Path map module 331 processes frame 340 and determines path map 341 which indicates vertical vanishing point (VVP) 353 along with a directional indication of the VVP at each pixel associated with frame 340. The vertical vanishing point, or VVP, indicates the point in the image or video frame plane where all 3-dimensional vertical perspective lines associated with scene 350 intersect. VVP 353 can be determined based on positioning information of a camera or image capture device, from a camera model, or mathematically by processing the image or frame pixels. In this example, VVP 353 is indicated below scene 350 with example rays/lines emanating from VVP 353 to emphasize the relationship between path map 341 the 3-dimensional vertical lines of scene 350 intersecting at VVP 353. The path map is a directional indicator matrix with the same number of elements as pixels in frame 340, with an indicator associated with each pixel of frame 340. The directional indicators of path map 341 indicate an amount of horizontal shift in pixels that should be applied when stepping row-by-row through pixels of frame 340 toward the VVP 353. It should be understood that a representative number of directional arrows are included in FIG. 3 for exemplary purposes only, and that a directional indicator may be included in path map 341 for each pixel. Also, the 'arrows' shown in FIG. 3 are merely representative, and other representations can be employed, such as a quantity of pixels to shift, numerical directional quantity, vector direction, or other representations, including combinations thereof.

Object detect module 332 processes scene 350 and frame 340 to perform object recognition and extraction on objects in scene 350. In this example, object detect module 332 recognizes human FIGS. 351-352 and extracts them into object image 342 as objects 354-355. Object image 342 is a binary representation of the pixels of frame 340 excluding any non-object data such as backgrounds, landscapes, structural elements, or other non-human elements. It should be understood that object detect module 332 can be configured to extract non-human objects instead of human objects, but in this example human FIGS. 351-352 are discussed. Object image 342 represents objects 354-355 in a binary pixel format, namely white pixels for objects 354-355 and black pixels for non-object portions. As seen in object image 342, black pixels are located in the interior of objects 354-355. Due to the object recognition and extraction process, visual artifacts or other imperfections encountered by the object recognition and extraction process may lead to pixels being not recognized as part of an object, or additional pixels being included unintentionally. These unintentionally excluded or included pixels reduce the quality of the objects, as represented by the black pixels in objects 354-355 in this example.

Pixel add module 333 determines additional pixels 356 to be associated with objects 354-355 to improve the quality of objects 354-355. As shown in altered object image 343, additional pixels 356 include the gray pixels located between objects 354-355 as well as the gray pixels which replaced the black pixels within objects 354-355 shown in object image 342. The gray pixels are colored gray in this example to illustrate and track the additional pixels 356 and to distinguish these additional pixels from the existing white object pixels and black background pixels. As shown after the inclusion of additional pixels 356, objects 354-355 now have the internal black pixels identified and as part of the objects instead of the background. However, although some pixels of additional pixels 356 improve the quality of objects 354-355 (i.e. the pixels internal to the object boundaries) other ones of additional pixels 356 have inadvertently connected or joined objects 354-355 together, thus reducing a quality of the individual objects as seen in altered object image 343.

In some examples, pixel add module 333 performs a 2-dimensional 'close' operation. A 'close' operation can include performing a 'dilate' operation followed by an 'erode' operation. In some examples, a variable kernel for these operations is employed, where the variable kernel is based on a depth of the object of interest in the scene, based on the 3-dimensional vertical vanishing point of the scene and the 2-dimensional position of the object of interest in the image or frame. Thus, for an object of interest that is 'near' to the video or imaging source, a larger kernel is used than for an object of interest that is 'far' from the video or imaging source. However, in other examples, a fixed kernel is used for adding pixels, while a subsequent variable kernel process is employed to remove pixels, such as in module 334.

Pixel remove module 334 removes unwanted or unintentional pixels added in module 333 to improve the quality of objects 354-355. In this example, pixel remove module 334 is employed to remove the gray pixels connecting objects 354-

355 in altered object image 343. Final object image 344 shows objects 357-358 as separate and high-quality objects representing objects 351-352. Several different methods can be employed to subtract or remove the appropriate ones of additional pixels 356 to arrive at final object image 344. Discussed below are at least two example processes performed on target pixels comprising object pixels and additional pixels to identify ones of the additional pixels to exclude from the objects of interest.

In a first example method of pixel removal, gray colored pixels are removed in line segments which start and end at black pixels, regardless of the length of the gray line segments. The gray line segments are typically one pixel in width. Altered object image 343 is scanned in a raster scan from bottom to top in this example. The bottom-to-top scan is based on the location of the VVP, and thus the scan would progress from the edge of the image nearest to the VVP. For each current pixel encountered during the scan, path map 341 is referenced for the current pixel and a 'next' pixel indicated (i.e. directed or pointed to) by the path map for the current pixel is checked. The next pixel is thus a pixel adjacent to the current pixel in the indicated direction towards the vertical vanishing point. If the current pixel is colored gray and the next pixel is colored black or already marked as 'visited' or 'removed,' then the current pixel is marked as 'visited.' However, if the current pixel is black and the next pixel is marked as visited, then the process walks or steps toward VVP 353 and marks all pixels already marked as visited as 'removed.' After the raster scan is complete, then all pixels marked as removed will be changed to black in color, thus removing those pixels from the objects. As noted previously, path map 341 indicates for each pixel an indicator directed towards VVP 353. As a further clarification, as the raster scan is performed bottom-to-top on the image, information in path map 341 points generally top-to-bottom (at an angle indicated by VVP 353), and thus for each current pixel encountered in the raster scan, a 'next' pixel will located adjacent to the current pixel but in a direction indicated by the path map.

In a second example method of pixel removal, r-map 345 and aux map 346 are employed. This second example method removes gray colored pixels in line segments whenever the line segments are at least 'r' pixels far from white colored pixels and along lines directed to the VVP. It should be noted that the 'r' parameter can be variable and change throughout processing of the image. First, r-map 345 is constructed as a matrix with an amount of matrix elements equal in number to the amount of pixels in the image, where each element in the r-map corresponds to a height in pixels of an average human projected along a y-axis and scaled or multiplied by the 'r' parameter noted above. Aux map 346 is then constructed which stores path length and enables tracking of the 'r' parameter throughout a raster scan of the image. Aux map 346 is typically initialized to all zeroes. Next, a raster scan is performed on the image from bottom to top (see discussion above for clarification on the direction of the raster scan) to identify a current pixel, and a next pixel is identified using path map 341 as described above. If the current pixel color is gray and then next pixel color is black or is already marked as visited or removed, then the current pixel is marked as visited. If the current pixel is gray and the next pixel is gray or marked as visited or removed, then aux map 346 is updated. A value of a 'current' element in aux map 346 corresponding to the current pixel is updated to the value of a 'next' element in aux map 346 corresponding to the next pixel, and a '1' is added to the value of the next element and stored in the current element of aux map 346. This operation indicates the length of the current gray line segment for the current pixel in aux map 346. If the current pixel is colored black or white, and the next pixel is gray or marked as visited, then the process walks or steps toward VVP 353 using path map 341 and selectively marks pixels encountered as 'removed' based on the 'r' distance using corresponding elements in aux map 346. After the raster scan is complete, then all pixels marked as removed will be changed to black in color, thus removing those pixels from the objects. Thus, in this second example process, an operation is performed on target pixels comprising object pixels and additional pixels to identify ones of the additional pixels to exclude from the objects of interest. The pixels to exclude in this example are located along lines directed to a vertical vanishing point of the scene which are 'r' number of pixels from white object pixels. The 'r' number of pixels can be based on an predetermined number, a variable number based on the VVP of the scene, or based on a height of an average human at each pixel in the scene, among other values.

Thus, as described in the modules of FIG. 3, additional pixels are added to improve the quality of extracted objects within a scene. However, too many additional pixels may be unintentionally added and thus a process to remove ones of the additional pixels which do not correspond to the object(s) of interest is performed. The addition or removal processes can be based on variable operation kernel sizes, as discussed herein, where the kernel sizes correspond to average sizes of the objects of interest at the particular depth of the objects in the scene. Thus, for human objects, the average size or height of a human figure is determined for each location or depth in the scene. Other object types can have different average sizes. The depth of an object in a scene can be determined by processing a vertical vanishing point of the scene and a 2-dimensional position of the object in the image to determine the likely 3-dimensional depth of the object in the actual scene captured in the image.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating an image processing system, the method comprising;
    identifying object pixels associated with an object of interest in a scene;
    identifying additional pixels to associate with the object of interest; and
    performing an operation based on a depth of the object in the scene on target pixels comprised of the object pixels and the additional pixels to change a quality of the object of interest;
    identifying a vertical vanishing point of the scene;
    processing the vertical vanishing point and a position of the object in the scene to determine the depth of the object in the scene;
    identifying a height of an average human in the scene for every pixel in the scene based on the vertical vanishing point;
    determining a variable kernel for the operation based on the height and the depth of the object in the scene; and
    performing the operation on the scene using the variable kernel.

2. The method of claim 1, wherein identifying the additional pixels to associate with the object of interest comprises performing a perspective based close operation on the scene.

3. The method of claim 1, wherein performing the operation on the target pixels comprises removing ones of the additional pixels which do not correspond to the object of interest.

4. The method of claim 1, wherein determining the vertical vanishing point comprises determining a path map matrix of the scene, wherein each element in the path map matrix comprises an indication of direction to the vertical vanishing point for a corresponding pixel in the scene.

5. The method of claim 1, wherein performing the operation on the target pixels comprises identifying ones of the additional pixels to exclude from the object of interest located along lines directed to a vertical vanishing point of the scene which are a first number of pixels from object pixels.

6. The method of claim 5, wherein the first number of pixels is based on a height of an average human.

7. The method of claim 1, wherein performing the operation on the target pixels comprises:
processing individual lines of the scene beginning with an edge of the scene nearest a vertical vanishing point of the scene to identify a current pixel of the target pixels; and
checking a next pixel of the target pixels against the current pixel to determine if the current pixel should be removed, wherein the next pixel comprises a pixel adjacent to the current pixel as indicated by a direction towards the vertical vanishing point.

8. A non-transitory computer-readable medium having program instructions stored thereon for operating an image processing system, that when executed by the image processing system, direct the image processing system to:
identify object pixels associated with an object of interest in a scene;
identify additional pixels to associate with the object of interest; and
perform an operation based on a depth of the object in the scene on target pixels comprised of the object pixels and the additional pixels to change a quality of the object of interest;
identifying a vertical vanishing point of the scene;
processing the vertical vanishing point and a position of the object in the scene to determine the depth of the object in the scene;
identifying a height of an average human in the scene for every pixel in the scene based on the vertical vanishing point;
determining a variable kernel for the operation based on the height and the depth of the object in the scene; and
performing the operation on the scene using the variable kernel.

9. The non-transitory computer readable medium of claim 8, wherein to identify the additional pixels to associate with the object of interest, the program instructions when executed by the image processing system direct the image processing system to perform a morphological close operation on the scene.

10. The non-transitory computer readable medium of claim 8, wherein to perform the operation on the target pixels, the program instructions when executed by the image processing system direct the image processing system to remove ones of the additional pixels which do not correspond to the object of interest.

11. The non-transitory computer readable medium of claim 8, wherein the instructions further direct the image processing system to:
identify a vertical vanishing point of the scene; and
processing the vertical vanishing point and a position of the object in the scene to determine the depth of the object in the scene.

12. The non-transitory computer readable medium of claim 11, wherein the object of interest comprises a human; and wherein the instructions further direct the image processing system to:
identify a height of an average human in the scene for every pixel in the scene based on the vertical vanishing point;
determine a variable kernel for the operation based on the height and the depth of the object in the scene; and
perform the operation on the scene using the variable kernel.

13. The non-transitory computer readable medium of claim 11, wherein to determine the vertical vanishing point, the program instructions when executed by the image processing system direct the image processing system to determine a path map matrix of the scene, wherein each element in the path map matrix comprises an indication of direction to the vertical vanishing point for a corresponding pixel in the scene.

14. The non-transitory computer readable medium of claim 8, wherein to perform the operation on the target pixels, the program instructions when executed by the image processing system direct the image processing system to identify ones of the additional pixels to exclude from the object of interest located along lines directed to a vertical vanishing point of the scene which are a first number of pixels from object pixels.

15. The non-transitory computer readable medium of claim 14, wherein the first number of pixels is based on a height of an average human.

16. The non-transitory computer readable medium of claim 8, wherein to perform the operation on the target pixels, the program instructions when executed by the image processing system direct the image processing system to:
process individual lines of the scene beginning with an edge of the scene nearest a vertical vanishing point of the scene to identify a current pixel of the target pixels; and
process a next pixel of the target pixels against the current pixel to determine if the current pixel should be removed, wherein the next pixel comprises a pixel adjacent to the current pixel as indicated by a direction towards the vertical vanishing point.

17. A method of operating an image processing system, the method comprising:
identifying an object of interest in a scene comprising object pixels; and
performing a close operation on the object pixels using a variable sized kernel to improve a quality of the object of interest,
wherein the variable sized kernel is based on an average height of a human in the scene at a depth of the object of interest in the scene, and wherein the depth of the object of interested in the scene is based on a the vertical vanishing point of the scene.

* * * * *